US009290667B2

(12) United States Patent
Akhtar et al.

(10) Patent No.: US 9,290,667 B2
(45) Date of Patent: Mar. 22, 2016

(54) TEMPORARY REMOVABLE SOLVENT BASED PROTECTIVE COATING

(71) Applicant: CSD, LLC, Atlanta, GA (US)

(72) Inventors: Parvez Akhtar, Roswel, GA (US); John Fitzwater, Atlanta, GA (US); Norman J. Greenberg, Marietta, GA (US)

(73) Assignee: CSD, LLC, Atlanta, GA (US)

( * ) Notice: Subject to any disclaimer, the term of this patent is extended or adjusted under 35 U.S.C. 154(b) by 244 days.

(21) Appl. No.: 14/031,486

(22) Filed: Sep. 19, 2013

(65) Prior Publication Data

US 2014/0018280 A1 Jan. 16, 2014

Related U.S. Application Data

(63) Continuation of application No. 11/842,291, filed on Aug. 21, 2007, now abandoned.

(60) Provisional application No. 60/914,123, filed on Apr. 26, 2007, provisional application No. 60/914,133, filed on Apr. 26, 2007.

(51) Int. Cl.
B65B 33/00 (2006.01)
C09D 5/00 (2006.01)

(52) U.S. Cl.
CPC .................................. C09D 5/008 (2013.01)

(58) Field of Classification Search
CPC ................................ C09D 5/008; C09D 5/20
USPC ........................................ 427/154, 155, 156
See application file for complete search history.

(56) References Cited

U.S. PATENT DOCUMENTS

| 3,366,586 | A | | 1/1968 | Crowley et al. |
| 3,477,969 | A | | 11/1969 | Parker |
| 3,802,952 | A | | 4/1974 | Gurin et al. |
| 3,855,170 | A | | 12/1974 | Junkin et al. |
| 3,932,191 | A | | 1/1976 | Jerabek et al. |
| 4,116,628 | A | * | 9/1978 | Hesse et al. ................... 427/154 |
| 4,179,304 | A | | 12/1979 | Rossomando |
| 4,451,597 | A | | 5/1984 | Victorius |
| 4,680,237 | A | | 7/1987 | Kenney et al. |
| 4,927,556 | A | | 5/1990 | Pokorny |
| 5,041,488 | A | | 8/1991 | Meades |
| 5,093,108 | A | | 3/1992 | Pappas et al. |
| 5,093,396 | A | | 3/1992 | Calhoun et al. |
| 5,100,735 | A | | 3/1992 | Chang |
| 5,104,719 | A | | 4/1992 | Kamen et al. |
| 5,158,998 | A | * | 10/1992 | Neri et al. ....................... 524/96 |
| 5,191,014 | A | | 3/1993 | Roberts et al. |
| 5,229,201 | A | | 7/1993 | Blanco |
| 5,320,693 | A | | 6/1994 | Helf |
| 5,328,535 | A | | 7/1994 | Blanco |
| 5,397,634 | A | | 3/1995 | Cahill et al. |
| 5,407,666 | A | | 4/1995 | Patel et al. |
| 5,509,969 | A | | 4/1996 | Grawe |
| 5,681,660 | A | | 10/1997 | Bull et al. |
| 5,688,494 | A | | 11/1997 | Graves et al. |
| 5,720,804 | A | | 2/1998 | Martin |
| 5,741,368 | A | | 4/1998 | Sahbari |
| 5,773,077 | A | | 6/1998 | Edmond |
| 5,785,958 | A | | 7/1998 | Sirdesai et al. |
| 5,789,067 | A | | 8/1998 | Mizumachi et al. |
| 5,851,614 | A | | 12/1998 | Buck |
| 5,904,976 | A | | 5/1999 | Berry et al. |
| 5,916,861 | A | | 6/1999 | Lyssy |
| 5,935,590 | A | | 8/1999 | Razzano |
| 5,945,462 | A | * | 8/1999 | Salamon ........................ 522/37 |
| 5,972,095 | A | | 10/1999 | Graves et al. |
| 5,985,951 | A | | 11/1999 | Cook |
| 6,017,862 | A | | 1/2000 | Doyel et al. |
| 6,054,208 | A | | 4/2000 | Rega et al. |
| 6,090,238 | A | | 7/2000 | Smith |
| 6,117,829 | A | | 9/2000 | Diaz et al. |
| 6,139,822 | A | | 10/2000 | Socci et al. |
| 6,180,228 | B1 | | 1/2001 | Mueller et al. |
| 6,187,849 | B1 | * | 2/2001 | Nugent et al. ................ 524/277 |
| 6,254,878 | B1 | | 7/2001 | Bednarek et al. |
| 6,254,970 | B1 | | 7/2001 | Hiatt et al. |
| 6,355,322 | B1 | | 3/2002 | Golledge |
| 6,428,814 | B1 | | 8/2002 | Bosch et al. |
| RE37,849 | E | | 9/2002 | Pokorny |

(Continued)

FOREIGN PATENT DOCUMENTS

| EP | 1884958 A1 | 2/2008 |
| GB | 977843 A | 12/1964 |
| WO | 2007059102 A2 | 5/2007 |

OTHER PUBLICATIONS

Extended European Search Report dated Apr. 18, 2013 in European Patent Application No. 08796926.7.
"Cellulose Esters," Eastman Chemical Company, Sep. 1994; http://www.eastman.com/Literature_Center/E/E138.pdf.
International Search Report of Application No. PCT/US08/73288, dated Nov. 3, 2008.
Product Data Sheet for CAB-553-1.4, Eastman Chemical Company, Aug. 2006.
"Cellulose Esters," Eastman Chemical Company, Sep. 1994, http://www.eastman.com/Literature.sub.--Center/E/E138.pdf.
"Product Data Sheet for CAB 553-0.4," Eastman Chemical Company, Aug. 2006.
International Search Report of PCT/US08/073288. Nov. 3, 2008.

Primary Examiner — Michael Wieczorek
(74) Attorney, Agent, or Firm — Kenyon & Kenyon LLP

(57) ABSTRACT

This invention is for a composition of clear or pigmented coating that is temporary and removable. It is especially designed to protect the surface of an automobile from the damaging effects of the environment and also from damage caused by normal daily use. The coating is a composition of 40 to 80% of cellulose acetate butyrate ester, 15 to 60% of an acrylic polymer and 2 to 10% of a sucrose acetate isobutyrate. The remover is a combination of tetrahydrofurfuryl alcohol, dibasic ester, diacetone alcohol, ethyl 3 ethoxypropionate; 2,2,4 trimethyl-1,3 pentanoldiol monoisobutyrate, and white mineral oil.

33 Claims, No Drawings

(56) References Cited

U.S. PATENT DOCUMENTS

| | | |
|---|---|---|
| 6,448,313 B1 * | 9/2002 | Patel ................................ 524/89 |
| 6,455,140 B1 | 9/2002 | Whitney et al. |
| 6,479,142 B1 | 11/2002 | Condon et al. |
| 6,511,547 B1 | 1/2003 | Sahbari |
| 6,534,461 B2 | 3/2003 | Lallier |
| 6,589,636 B2 | 7/2003 | Emslander et al. |
| 6,613,412 B1 | 9/2003 | Dressler |
| 6,616,920 B1 | 9/2003 | Ito et al. |
| 6,689,441 B1 | 2/2004 | Kim |
| 6,783,829 B2 | 8/2004 | Arena |
| 6,793,859 B2 | 9/2004 | Emslander et al. |
| 6,830,803 B2 | 12/2004 | Vaidya et al. |
| 6,855,210 B1 | 2/2005 | Dostie et al. |
| 6,857,737 B2 | 2/2005 | Emslander et al. |
| 6,875,497 B2 | 4/2005 | Emery et al. |
| 6,942,911 B2 | 9/2005 | Nakayama |
| 6,984,427 B2 | 1/2006 | Galkiewicz et al. |
| 7,291,233 B2 | 11/2007 | Brigato |
| 7,296,826 B2 | 11/2007 | Hagen |
| 7,402,223 B2 | 7/2008 | Marks, III et al. |
| 2001/0039316 A1 | 11/2001 | Campbell et al. |
| 2002/0139392 A1 | 10/2002 | Cervero et al. |
| 2003/0113356 A1 | 6/2003 | Deckner et al. |
| 2004/0025907 A1 | 2/2004 | Tadych |
| 2004/0043221 A1 | 3/2004 | Bharti et al. |
| 2004/0091682 A1 | 5/2004 | Brinkmann |
| 2004/0175407 A1 | 9/2004 | McDaniel |
| 2004/0200568 A1 | 10/2004 | Rhein et al. |
| 2005/0019359 A1 | 1/2005 | Amato et al. |
| 2005/0026799 A1 | 2/2005 | Detar et al. |
| 2006/0003114 A1 | 1/2006 | Enlow et al. |
| 2006/0019068 A1 | 1/2006 | Hannington |
| 2006/0020079 A1 | 1/2006 | Lorenzo et al. |
| 2006/0025511 A1 * | 2/2006 | Silvers et al. .................. 524/445 |
| 2006/0089281 A1 | 4/2006 | Gibson |
| 2006/0222831 A1 | 10/2006 | Sloan |
| 2006/0251688 A1 | 11/2006 | Gajanan et al. |
| 2007/0054998 A1 | 3/2007 | Harashina |
| 2007/0095002 A1 | 5/2007 | Kim-Whitty |
| 2007/0095003 A1 | 5/2007 | Hei et al. |
| 2007/0107636 A1 * | 5/2007 | Warren ........................ 106/499 |
| 2007/0110966 A1 | 5/2007 | Warren |
| 2007/0218238 A1 | 9/2007 | Greer |
| 2007/0231281 A1 | 10/2007 | Socci |
| 2007/0258940 A1 | 11/2007 | Hamilton et al. |
| 2008/0003406 A1 | 1/2008 | Steelman |
| 2008/0085953 A1 | 4/2008 | Bhattacharya et al. |
| 2008/0135163 A1 | 6/2008 | Farmer |
| 2008/0206583 A1 | 8/2008 | Phan et al. |
| 2008/0264599 A1 | 10/2008 | Blejde et al. |

* cited by examiner

TEMPORARY REMOVABLE SOLVENT BASED PROTECTIVE COATING

CROSS-REFERENCE TO RELATED APPLICATION

This is a continuation of U.S. patent application Ser. No. 11/842,291, filed Aug. 21, 2007, which application claims priority to U.S. Provisional Application No. 60/914,123, entitled "A Water Based Back Coat For Temporary Graphics Fabrication," filed Apr. 26, 2007, and U.S. Provisional Application No. 60/914,133, entitled "A Solvent Based Top Coating For Temporary Graphics Fabrication," filed Apr. 26, 2007, the disclosures of all of which applications are herein incorporated by reference in their entirety.

TECHNICAL FIELD

The present invention is generally related to a temporary removable solvent based protective coating and to removers for removing such coatings.

This invention also provides a remover composition that is biodegradable, and a method for easily removing the temporary coating using the remover, without damage to the underlying substrate. After removal and clean up, a new temporary coating can be repeatedly re-applied to the same surface.

BACKGROUND OF THE INVENTION

Painted and unpainted surfaces on automobiles, trucks, buses, vans, off-road equipment, construction equipment and other moving vehicles such as marine, military and aeronautical crafts are subject to damage from acid rain, flying road debris, insects, bird droppings, tree rosin, tar, asphalt, UV light, dirt, pollution and many other environmental and mechanical influences.

A number of polymer systems exist that can be used to formulate a temporary coating, such as nitrocellulose, acrylics, vinyl chloride, alkyds, polyesters, polyvinyl butyrals, polyvinyl formals, polyvinyl acetates, shellac, ethylene vinyl chlorides, urethanes and ethylene acrylic acids. Many of the polymer systems mentioned require very strong solvents to remove the coatings once dried. Consequently, these strong solvents damage the painted surface to which the coatings are applied.

For automobiles, a protective fabric is often used and applied to the front of the vehicle to provide protection against insects and flying debris from the road during normal use. The protective fabric drastically changes the appearance of the automobile.

Specialized silicone polishes and protectants are sold to protect the painted surfaces on automobiles from the damaging effects of acid rain and other environmental influences. Paint protectants based on silicones generally last only for a small number of car washes before they are washed away. Silicone protectants do not protect painted finishes against damage from flying road debris, insects, bird droppings, tree rosin, tar, asphalt and many other environmental and mechanical influences.

Peelable coatings have been evaluated in the market place but are not popular as they cannot be easily removed from painted surfaces after having been left on surfaces exposed to the environment for some time. Peelable coatings are also expensive to install.

Some wax based coatings have been used to protect painted and unpainted surfaces on automobiles during storage and shipment. The wax based coatings are very limited in their applications as they tend to accumulate dust and dirt, and are aesthetically not appealing. They require removal with solvents such as aliphatic hydrocarbons which raises concerns with respect to environmental compliance and safety with respect to flammability issues.

The first generation of original equipment manufacturer (OEM) automotive finishes in 1924 were based on nitrocellulose lacquer. Alkyd enamels were the next improvement, followed by the introduction of acrylic lacquers in 1956. In the 1960's acrylic enamels were introduced, followed by several variants and refinements. Metallic colors were introduced in 1980, using the concept of a basecoat with a clear top coat. Soon after, mica based pearlescent colors were introduced, followed by the tri-coat concept, which used a pearlescent layer sandwiched between a solid basecoat and a clear top coat.

Present day OEM automotive finishes are high temperature thermoset coatings usually baked at 150 to 160 degrees Centigrade. The common generic categories of these paints are thermosetting acrylic; reflow thermoplastic acrylic and high bake alkyd melamine.

Present day automotive re-finishes are based on either lacquer type paints or crosslinking type paints. The lacquer types are nitrocellulose or acrylic based, and have mostly been phased out in the developed markets due to technical and environmental reasons but are still often used in the developing nations. The crosslinking type paints are based on a variety of chemistries such as: alkyds; alkyds with melamine; alkyds with isocyanate; acrylic enamels and most commonly acrylic urethane. There are many other refinements and modifications to these generic categories.

A need exists in the market for a specialized clear or pigmented temporary coating that when applied to painted or unpainted surfaces will protect the surface from harmful effects of environmental exposure and light mechanical abuse. The coating should be durable, yet easily removable without damaging the underlying substrate. The temporary coating should not affect the appearance of the painted finish except for adding some gloss, and should be able to be buffed and compounded to blend into the existing finish. The temporary protective coating could also be pigmented or colored to match the existing color and gloss of the painted finish using conventional colorants used by body shops. In certain cases automotive coatings contain special metallic or pearlized pigments that are used to obtain special effects. The specialized coatings should be able to be formulated to allow the metallic and pearlized pigments to orientate in the coating to obtain the required appearance effects. Temporary coatings on the market today are not easily removable without harming the underlying substrate, and do not have the necessary durability and adhesion properties to remain intact for even a short time.

A need also exists in the market for a method to remove the temporary protective finish, once the benefits of it are completed. Many removers exist in the market place such as paint strippers that can easily remove a temporary coating. However, such commercial paint strippers will damage the painted finishes to which the temporary coating is applied. The need is for the temporary coating to be easily removable with a special non-polluting biodegradable remover, without causing any harm to the underlying substrate. The wax based coatings require removal with solvents such as aliphatic hydrocarbons which raise concerns with respect to environmental compliance and fire hazard.

SUMMARY OF THE INVENTION

This invention provides a removable coating composition which is used for temporarily coating various types of automobile bodies, machinery and equipment, and when desired, the coating can be easily removed without harming the underlying substrate.

The coating of this invention after application offers good protection against wear and scratching, and has good resistance against environmental factors and common detergents encountered during normal use. When desired, the temporary coating can be removed in a short time by treating the coating with a specially formulated remover composition.

This invention is for a clear or pigmented coating that is durable, yet temporary and easily removable. It is designed to be used for coating surfaces such as a painted automobile or other moving vehicle body, a marine or aeronautical craft body and other equipment or machinery. The coating protects the painted or unpainted surfaces from marring, scratching and other light physical damage, ultraviolet (UV) light and other damage due to environmental factors such as acid rain, oxidation, bird droppings and bugs. The temporary coating, once applied to a painted finish, has excellent clarity, durability, UV resistance, resistance to water and common detergents and oxidation resistance. The temporary coating can be used as a protective temporary removable coating for the front of motor vehicles to act as a protectant against flying debris and road chips during normal use. The temporary coating can be pigmented or colored to match the existing color and gloss of the painted finish using the conventional colorants used by body shops.

The temporary coating can also be used to protect painted and unpainted surfaces of automobiles or other machinery and equipment in transit during shipment. The temporary coating may contain special metallized pigments that are used to obtain special effects. Coatings can be formulated to allow the metallized pigments to orientate in the coating to obtain the required appearance. The pigmented coating can also be used to make temporary removable signs that can be applied directly onto surfaces by standard methods such as screen printing, spray or roller.

A specialized temporary clear coating was developed that when applied to painted surfaces will protect the surface from harmful environmental exposure and light mechanical abuse. The temporary clear coating does not affect the appearance of the painted finish except for adding some gloss. The temporary protective coating can be buffed and compounded to blend into the existing finish. The temporary protective coating can also be pigmented or colored to match the existing color and gloss of the painted finish using conventional colorants used by body shops.

This invention also provided a special remover composition that is able to remove the coating, even after extended use, without causing any harm to the underlying substrate. The remover composition is based on VOC exempt solvents, is biodegradable and does not contain any flammable components nor does it contain any hazardous air pollutants (HAPS). After removal and clean up, a new temporary coating can be repeatedly re-applied to the same surface.

DETAILED DESCRIPTION OF THE PREFERRED EMBODIMENT

A polymeric coating is provided that can be used as a temporary removable coating on automobile or other vehicle bodies, as well as on a wide variety of other surfaces. In addition, a remover is provided that easily removes the temporary coating from the various surfaces without damage to the underlying substrate.

The polymeric coating is made from a combination of polymers, namely, a cellulose acetate butyrate ester and acrylic polymer. Cellulose acetate butyrate ester (CAB) is preferably one that is soluble in low molecular weight alcohols, such as methyl alcohol, ethyl alcohol, isopropyl and N-propyl alcohol and some other common organic solvents. Preferably the CAB has a high hydroxyl content, such as 3 to 6% by weight which aids in its alcohol solubility. The preferred CAB is CAB 553-0.4 produced by Eastman Chemical Company. CAB-553-0.4 has a high hydroxyl content of approximately 4.8% by weight. It is important that the CAB have a high hydroxyl content so that it is soluble in the lower molecular weight alcohols. CAB 531.1 can also be used but it is not as good as the CAB 553-0.4 because of its lower solubility in alcohol. It has approximately 1.7% by weight of hydroxyl content.

In order to improve the toughness, durability, adhesion and other specific properties various acrylic polymers were tested for modifying the coating properties. Acrylics with molecular weights between 20,000 and 200,000 MW and internally modified by grafting with a mixture of methacrylates, styrene, acrylates, acrylic acid, itaconic acid and methacrylic acid can be used. In addition certain functional monomers such as trimethylol propane triacrylate and tertiary butyl amino ethyl acrylate and ethyl methacrylate are generally used to improve adhesion and compatibility. Different manufacturers produce various acrylic copolymers that are generically very similar, but have differences in specific properties due to their different internal molecular modifications and grafting. Such details are usually not revealed in the sales and technical literature. Detailed experimental testing was done for this invention, to identify and select the desirable polymers on the basis of specific results achieved.

The CAB was mixed with one or more acrylic polymers of the above description. One of the preferred acrylic polymers is a methyl methacrylate and n-butyl methacrylate copolymer. NeoCryl B-734 is a preferred acrylic polymer. This acrylic polymer is manufactured by DSM NeoResins, Inc. This acrylic polymer is soluble in some of the lower molecular weight alcohols. This particular polymer has an advantage in that it is resistant to gasoline, oil and grease which may be important in some applications. NeoCryl B-734 has an average molecular weight (MW) of 105,000, a glass transition temperature (Tg) of 45 degrees C. and an acid value of zero. Using this product in blends with cellulose acetate butyrate improved the overall properties including the adhesion to thermoset topcoats.

The other acrylate can also be a copolymer of methyl methacrylate and n-butyl methacrylate. An example of such a copolymer is NeoCryl B-723 which has a molecular weight of about 200,000, a Tg of 48 degrees C. and an acid value of 5.5. The NeoCryl B-734 is preferred because of its higher solubility and other characteristics such as solution viscosity, film forming and compatibility with the other ingredients of the formulation. The NeoCryl B-734 has an excellent compatibility with CAB and also has superior inter-coat adhesion and cohesion properties when applied to other precoated surfaces.

Another acrylic polymer that was used is a copolymer of n-butyl methacrylate and methyl methacrylate sold under the name BR-106 by Dianal America, Inc. It has a molecular weight of approximately 60,000, a Tg of 58 degrees C. and an acid value of 3.0. This was selected to improve adhesion to metals and also enable improved pigment dispersion and compatibility with metallic pigments due to its acid value. A mixture of BR-106 and B-734 is preferred, as it provides the right balance of chemical resistance, compatibility, removability, film quality, flexibility, adhesion and hardness.

It is important that the molecular weight of the acrylic copolymer not be too high as it must be soluble in the alcohol solvents used for the coating of this invention. The n-butyl methacrylate has a lower molecular weight than the methyl methacrylate so that the average molecular weight of the copolmer of the two must be within a range that is soluble in the alcohol solvents. Another factor is the Tg of the copolymer which should preferably be in the 48 to 80 degrees C. range to have the right degree of hardness for a temporary removable coating. The acid value of the copolymer is important as it adds to the intercoat adhesion to paints, especially metallic paints. The acid value should preferably be in the range of from 0 to 5.

It is preferred to add sucrose acetate isobutyrate to the mixture of polymers. The preferred sucrose acetate isobutyrate is SAIB 100 manufactured by Eastman Chemical, Inc. It serves as a modifying extender for the polymer films. The SAIB 100 has a molecular weight of from 832 to 856. It is also soluble in the lower molecular weight alcohols. The SAIB 100 has a plasticizing effect and improves compatibility, leveling and clarity of the film.

The polymeric top coat of this invention was prepared by mixing the polymers together and dissolving them in a mixture of glycol ethers and alcohol based solvents. Preferably from 40 to 80% by dry weight of a cellulose acetate butyrate ester (CAB) is mixed with 15 to 60% of an acrylic polymer and 2 to 10% of a plasticizer. Preferably 50 to 70% of CAB is used and 20 to 50% of an acrylic polymer and 2 to 10% of sucrose acetate isobutyrate as a plasticizer or extender is used.

The best results were obtained by using approximately 68% by dry film weight of cellulose acetate butyrate ester (CAB 553-0.4) and a mixture of two acrylic polymers. One of these is B-734 which is a zero acid value, 105,000 MW, and is a methyl methacrylate and n-butyl methacrylate copolymer and the other is BR-106 which is also a copolymer of methyl methacrylate and n-butyl methacrylate, but has an acid value of 3.0 and a MW of 60,000. B-734 can be used in an amount of approximately 15% by dry film weight while the BR-106 is used in an amount of 10% by dry film weight. The sucrose acetate isobutyrate (SAIB 100) is used in an amount of approximately 5% by dry film weight.

This dry mixture of polymers described above is dissolved in a mixture of polar solvents. A combination of ethyl alcohol, isopropyl alcohol, diacetone alcohol, propylene glycol monomethyl ether acetate, tetrahydrofurfuryl alcohol and ethyl 3 ethoxypropionate is used. It has been found that approximately 20 to 30% of the solvent and polymers can be ethyl alcohol with approximately 10 to 12% isopropyl alcohol and 10 to 20% of diacetone alcohol and 10 to 20% of propylene glycol monomethyl ether acetate and 2 to 5% of tetrahydrofurfuryl alcohol and 2 to 5% of ethyl 3 ethoxypropionate, based upon the weight of the batch. The preferred solvent mixture is approximately 26% ethyl alcohol, 11% isopropyl alcohol, 15% diacetone alcohol and 15% propylene glycol monomethyl ether acetate and 4% tetrahydrofurfuryl alcohol and 4% of ethyl 3 ethoxypropionate, based upon the weight of the batch as shown in Table III infra.

A flow improver was added to the formulation in small amounts to help flow and leveling and to reduce or eliminate film defects such as craters, crawling and fisheyes. These help provide a uniform film during applications such as spraying. The flow improver was BYK 307, which is a polyether modified polydimethylsiloxane supplied by BYK-Chemie GmbH. It may be added from 0.1% to 1% by total weight of formulation and preferably at 0.5%. Flow agents such as fluorocarbons, low molecular weight acrylics and surfactants can also be used.

The two types of light stabilizers used in this invention are: Ultraviolet Light Absorbers (UVA) and Hindered-Amine Light Stabilizers (HALS). UVA filter harmful UV light and prevent mainly discoloration and delamination of coatings. HALS trap free radicals once they are formed and are mainly effective to retain surface properties such as gloss and prevent cracking and chalking of paints. HALS and UVA show a synergistic effect when used in combination, and give coatings superior protection against gloss reduction, cracking, blistering, delamination and color change.

TINUVIN 292 is a HALS type manufactured by Ciba Specialty chemicals, Inc. and is an almost pure mixture of the two active ingredients Bis(1,2,2,6,6-pentamethyl-4-piperidyl) sebacate, and Methyl (1,2,2,6,6-pentamethyl-4-piperidyl) sebacate. It may be added at 0.1% to 1% and preferably at 0.3% by weight of the dry film. TINUVIN 1130 is a UVA manufactured by Ciba Specialty Chemicals, Inc., based on benzotriazole. It may be added at 0.1% to 2% and preferably at 0.3% of the weight of the dry film. In this invention, HALS and UVA were used together as they show a synergistic effect when used in combination.

Polymeric films made from the solutions demonstrated the flexibility, toughness and clarity required and the intercoat adhesion properties between the coated substrates and the polymeric temporary coating film was excellent. The finished formula was tested on top of painted automobile finishes with excellent adhesion and durability. The finished formula exhibited excellent compatibility with the popular colorants used in automotive body shops. The reducer M3 shown in Table-I, infra, was added to thin the material to allow the product to be sprayed.

General Testing:

The product was tested by spraying on to many different types of vehicle surfaces such as automobiles, marine and aeronautical craft and military vehicles. After drying, the temporary coating exhibited excellent weathering, water and detergent resistance and UV resistance. Traditional washing and polishing methods did not remove the temporary coating and did not harm the coating. The temporary coating also showed good resistance to abrasion, scratches and other minor physical abuse encountered in normal daily activity of the vehicles. The coating can be pigmented with traditional body shop colorants and sprayed on to the above mentioned vehicles, to match the desired appearance. It can be buffed and blended so as to not change the appearance of the vehicle.

Field Testing Done:

Commercially available DuPont-Spies Hecker (SH) 1K system 293/295 series was used in the tests. Their Red and Metallic and Pearl and Reducers #3363 (medium) and #3365 (slow) were checked out and found to be fully compatible with our formulation #M16A.

The Spies Hecker one pack Acrylic clear coat #8020 was used as a reference for viscosity, clarity and other film properties. A Din 4 cup was used for viscosity (visc) measurement. According to their guidelines, ideal spraying viscosity was considered to be 18 to 20 sec for their system.

Spray gun: SATA 1.3 RP3000 (make and model)
Air pressure: 33-35 psi.
Air flow: as usual; 83 degrees F., in down draft booth.
Flash off (drying time) between coats was approximately 3 to 5 minutes.
Dilution: 2 parts #M16A+1 part (SH) Reducer #3365→visc.=57 sec.
1 parts #M16A+1 part (SH) Reducer #3365→visc.=25 sec.
Red Coat of #M16A: (3 coats were done)

Dilutions:
(a) 12 oz. #M16A+4 oz. Red+8 oz. Reducer #3365→visc.=30 sec.
(b) 12 oz. #M16A+4 oz. Red+12 oz. Reducer #3365→visc.=25 sec.
(c) 12 oz. #M16A+4 oz. Red+16 oz. Reducer #3365→visc.=22 sec.
(c) was sprayed as the red for testing.
Clear Coat of #M16A: (2 coats were done)
This was done using the same conditions as noted above.
The test coats were sprayed onto a yellow OEM-painted Chevrolet S-10 hood.

Observations:

Sprayed coat showed good coverage as well as good metallic control.

Coats put on were heavier than usual; slight texture noticed, but not of concern.

Overall 'feel' and impression as compared to a regular car paint → very good.

After fully drying, the clear coat seemed to have an acceptable level of gloss.

Removing the Temporary Coating from the Substrate

After being in service for some time, the temporary coating was easily removed by brushing onto it the specially formulated remover, and let stand for 5 to 10 minutes. The remover easily dissolved the temporary coating from the automobile without damage to the original paint finish. A number of different remover formulas were tried. The remover of this invention does not affect OEM car finishes and polyurethane acrylic type cross-linked refinish car top coats. In the industry, the cross-linked type refinishes are also referred to as two pack systems. The removers must have a polar nature and have solubility close to the nature of alcohols. Non-polar solvents such as xylene and toluene could not be thickened and also attacked the painted surface of the automobile. Low molecular weight ketones and esters also had a noticeable adverse effect on the original automobile finish. The remover formulation #R-4 shown in Table VIII, infra, had the best balance of polarity, solubility, evaporation rate and thickening ability.

The temporary coating was easily removed from the substrate by using the remover developed by this invention. Many removers for polymeric coatings and films are readily available on the market today, and are commonly referred to as "paint strippers". Commercial paint strippers easily removed many of the polymeric temporary coatings tested, but with considerable damage to the painted surface on which the coating was applied to. In addition, fast evaporating ketones, esters and alcohols posed less damage to the painted surfaces based upon their low flash points but were not effective removers due to short contact times. The remover composition of this invention will dissolve and remove the polymers and any additives that are included in the temporary coating, without harming the underlying substrate.

In this invention, a remover was developed using a biodegradable alcohol such as tetrahydrofurfuryl alcohol and a biodegradable ester solvent such as dibasic ester. The tetrahydrofurfuryl alcohol is not an aggressive solvent and consequently does not harm most substrates. This is also true of the dibasic ester. A small amount of three other solvents can also be included. They are diacetone alcohol, ethyl 3 ethoxypropionate and 2,2,4 trimethyl-1,3-pentanediol monoisobutyrate (Table VIII, infra,). A combination of solvents is necessary in order to have a reasonably fast speed of removal of the coating, without causing harm to the substrate, as the different polymers in the coating have different solubilities in the various solvents. A small amount of white mineral oil (paraffin) can be included to help the dispersion of the dissolved polymers and to prevent the re-agglomeration and film forming tendency due to evaporation of the solvents, especially in warm weather conditions. The remover composition is biodegradable and based on VOC exempt solvents. It does not contain any flammable components nor does it contain any hazardous air pollutants (HAPS). After removal and clean up, a new temporary coating can be repeatedly re-applied on to the same surface.

The remover has a formulation of:
from 50 to 80% of tetrahydrofurfuryl alcohol;
from 5 to 20% of dibasic ester;
from 1 to 12% of diacetone alcohol;
from 1 to 12% of the ethyl 3 ethoxypropionate;
from 1 to 12% of the 2,2,4 trimethyl-1,3 pentanoldiol monoisobutyrate
from 1 to 10% of white mineral oil.

A surfactant such as ethoxylate of nonylphenol may be incorporated in the formulation and used to help clean the surface of the substrate when rinsed with water. A satisfactory surfactant is Surfonic® N-95. A surfactant may be added in an amount of from 0.25 to 1% by weight of the remover. Hydroxypropyl methylcellulose may be used as a thickener for the solvents. Methocel® 311 has been found to be a satisfactory thickening agent that can increase the viscosity of the solvent composition. A thickening agent may be added in an amount of from 0.25 to 1.5% by weight of the remover. The preferred composition of the remover is as follows:

| | |
|---|---|
| Tetrahydrofurfuryl alcohol | 66.00% by weight |
| Dibasic ester | 10.00% by weight |
| Diacetone Alcohol | 6.00% by weight |
| EEP Solvent (ethyl 3-ethoxypropionate) | 6.00% by weight |
| Texanol ester (2,2,4-trimethyl-1,3-pentanediol monoisobutyrate) | 6.00% by weight |
| White mineral oil | 5.00% by weight |
| Surfonic N-95 | 0.50% by weight |
| Methocell 311 | 0.50% by weight |

The remover can then be applied by spraying, brushing or by roller. Dwell time for the remover to activate is between one to ten minutes. The remover along with the dissolved coating can then be wiped away with a clean cloth, without damage to the substrate. A high surface area synthetic non-woven absorbent pad may also be used to absorb the remover and the dissolved polymeric film so that the disposable soluble waste formed can be disposed of in a landfill with no environmental damage to the area where the coating is removed. The dissolved coating may also be rinsed away by spraying with water.

If the substrate is a cross-linked type painted or coated surface, the remover will not cause any damage to it. The present day OEM car finishes are of this category. Also, the majority of the present day urethane acrylic (2 pack) refinish top coats fall in this category.

The performance of all these components of the proposed system are interdependent on the behavior of the ingredients, and their balanced behavior is critical to the end results of this invention. The properties of the removable coating should have enough resistance to withstand the wear and tear of the intended use, and when desired, it should be easily removable by being dissolved in the special remover, without damaging the substrate.

As a representative of the several coatings and solvents used for these coatings and removers with the characteristics described above, the following Tables and Examples are included.

EXAMPLES

Tables

TABLE I

Formula # Solvent Calculation
Product: Reducers M0, M1, M2, M3 (Medium to Slow Evaporation Rate)

| Ser. # | Name of Ingredient. | Final Formulation wt % | | | |
|---|---|---|---|---|---|
| | | version M0 | version M1 | version M2 | version M3 |
| 1 | Alcohol - denatured; technical grade | 45.00 | 35.00 | 35.00 | 35.00 |
| 2 | Isopropyl Alcohol | 15.00 | 15.00 | 15.00 | 15.00 |
| 3 | Diacetone Alcohol | 27.00 | 15.00 | 20.00 | 20.00 |
| 4 | EB Solvent (Ethylene glycol n-butyl ether) | 0.00 | 10.00 | 5.00 | 0.00 |
| 5 | PM acetate (propylene glycol monomethyl ether acetate) | 0.00 | 10.00 | 20.00 | 20.00 |
| 6 | tetrahydrofurfuryl alcohol | 5.50 | 0.00 | 5.00 | 5.00 |
| 7 | EEP Solvent (ethyl 3-ethoxypropionate) | 6.00 | 15.00 | 0.00 | 5.00 |
| 8 | texanol ester (2,2,4-trimethyl-1,3-pentanediol monoisobutyrate) | 1.50 | 0.00 | 0.00 | 0.00 |
| | Total >>>>>>> | 100.00 | 100.00 | 100.00 | 100.00 |
| | Calculated evaporation rate (relative to n-butyl acetate = 1) --------------> | 1.0527 | 0.9190 | 0.9490 | 0.9495 |

>>> The mixture of solvents forms a clear solution. Density is 0.849 g/ml in both cases.

TABLE II

Formula #M16
Product: Top Coating

| Ser. # | Name of Ingredient. | Final Formulation | | | |
|---|---|---|---|---|---|
| | | Wt. (grams) ---*--------- | Wt. (%) ingredient | Wt. (%) dry solids | Wt. (%) in dry film |
| 1 | CAB 553-0.4 = Cellulose Acetate Butyrate - Eastman | 11.9600 | 11.96% | 11.96% | 59.41% |
| 2 | acrylic B734 = DSM-NeoResins. | 3.9900 | 3.99% | 3.99% | 19.82% |
| 3 | acrylic BR106 = Dianal America Inc. | 2.6600 | 2.66% | 2.66% | 13.21% |
| 4 | SAIB 100 = Sucrose Acetate Isobutyrate - Eastman | 1.3300 | 1.33% | 1.33% | 6.61% |
| 5 | tinuvin 292 = UV light stabilizer - Ciba | 0.0700 | 0.07% | 0.07% | 0.35% |
| 6 | tinuvin 1130 = UV absorber - Ciba | 0.0700 | 0.07% | 0.07% | 0.35% |
| 7 | BYK 307 = surface additive - BYK-Chemie GmbH Reducer M2 = 79.87% wt. | 0.0500 | 0.05% | 0.05% | 0.25% |
| 1 | Alcohol - denatured; technical grade | 27.9545 | 27.95% | | |
| 2 | Isopropyl Alcohol | 11.9805 | 11.98% | | |
| 3 | Diacetone Alcohol | 15.9740 | 15.97% | | |
| 4 | EB Solvent (Ethylene glycol n-butyl ether) | 3.9935 | 3.99% | | |
| 5 | PM acetate (propylene glycol monomethyl ether acetate) | 15.9740 | 15.97% | | |
| 6 | tetrahydrofurfuryl alcohol | 3.9935 | 3.99% | | |
| 7 | EEP Solvent (ethyl 3-ethoxypropionate) | 0.0000 | 0.00% | | |
| | Total Input >>>>>>> = | 100.00 | 100.00% | 20.13% | 100.00% |

>>> This makes a clear film. Viscosity at this concentration = 128 cp at 25 degrees C. Also, gives good levelling and initial gloss, but shows very slight blushing effects. Coated a film to test on car. Shows very mild attack by Cleaner-409 ® and also by Windex ® solution.

TABLE III

Formula #M16A
Product: Top Coating

| Ser. # | Name of Ingredient. | Final Formulation | | | |
|---|---|---|---|---|---|
| | | Wt. (grams) ---*--------- | Wt. (%) ingredient | Wt. (%) dry solids | Wt. (%) in dry film |
| 1 | CAB 553-0.4 = Cellulose Acetate Butyrate - Eastman | 16.4100 | 16.41% | 16.41% | 67.92% |
| 2 | acrylic B734 = DSM-NeoResins. | 3.7900 | 3.79% | 3.79% | 15.69% |
| 3 | acrylic BR106 = Dianal America Inc. | 2.5300 | 2.53% | 2.53% | 10.47% |
| 4 | SAIB 100 = Sucrose Acetate Isobutyrate - Eastman | 1.2000 | 1.20% | 1.20% | 4.97% |
| 5 | tinuvin 292 = UV light stabilizer - Ciba | 0.0750 | 0.08% | 0.08% | 0.31% |

TABLE III-continued

Formula #M16A
Product: Top Coating

| Ser. # | Name of Ingredient. | Wt. (grams) ---*--------- | Final Formulation Wt. (%) ingredient | Wt. (%) dry solids | Wt. (%) in dry film |
|---|---|---|---|---|---|
| 6 | tinuvin 1130 = UV absorber - Ciba | 0.0750 | 0.08% | 0.08% | 0.31% |
| 7 | BYK 307 = surface additive - BYK-Chemie GmbH | 0.0800 | 0.08% | 0.08% | 0.33% |
|  | Reducer M3 = 75.84% wt. |  |  |  |  |
| 1 | Alcohol - denatured; technical grade | 26.5440 | 26.54% |  |  |
| 2 | Isopropyl Alcohol | 11.3760 | 11.38% |  |  |
| 3 | Diacetone Alcohol | 15.1680 | 15.17% |  |  |
| 4 | EB Solvent (Ethylene glycol n-butyl ether) | 0.0000 | 0.00% |  |  |
| 5 | PM acetate (propylene glycol monomethyl ether acetate) | 15.1680 | 15.17% |  |  |
| 6 | tetrahydrofurfuryl alcohol | 3.7920 | 3.79% |  |  |
| 7 | EEP Solvent (ethyl 3-ethoxypropionate) | 3.7920 | 3.79% |  |  |
|  | Total Input >>>>>>> = | 100.00 | 100.00% | 24.16% | 100.00% |

>>> This makes a clear film. Viscosity at this concentration = 275 cps at 25 degrees C. Also, gives good levelling and gloss. Was tested on car. Shows no attack by Cleaner-409 ® or Windex ® solution or car washes. Has good hardness & adhesion.

TABLE IV

Formula #DX-2-a-2
Product: Top Coating

| Ser. # | Name of Ingredient. | Wt. (grams) ---*--------- | Final Formulation Wt. (%) ingredient | Wt. (%) dry solids | Wt. (%) in dry film |
|---|---|---|---|---|---|
| 1 | CAB 531.1 | 8.00 | 8.51% | 8.51% | 40.00% |
| 2 | acrylic B723 = DSM-NeoResins. | 12.00 | 12.77% | 12.77% | 60.00% |
| 4 | Alcohol, denatured, 95% | 54.00 | 57.45% |  |  |
| 5 | Dibasic Ester | 0.00 | 0.00% |  |  |
| 6 | Diacetone Alcohol | 20.00 | 21.28% |  |  |
|  | Total Input >>>>>>> = | 94.00 | 100.00% | 21.28% | 100.00% |

>>> This makes a clear film, but has some insoluble particles, apparently from the CAB. Viscosity was about 4500 cps at 25 degrees C.

TABLE V

Formula #DX-2-c-2
Product: Top Coating

| Ser. # | Name of Ingredient. | Wt. (grams) ---*--------- | Final Formulation Wt. (%) ingredient | Wt. (%) dry solids | Wt. (%) in dry film |
|---|---|---|---|---|---|
| 1 | CAB 531.1 | 8.00 | 8.51% | 8.51% | 40.00% |
| 2 | acrylic B734 = DSM-NeoResins. | 12.00 | 12.77% | 12.77% | 60.00% |
| 4 | Alcohol, denatured, 95% | 54.00 | 57.45% |  |  |
| 5 | Dibasic Ester | 0.00 | 0.00% |  |  |
| 6 | Diacetone Alcohol | 20.00 | 21.28% |  |  |
|  | Total Input >>>>>>> = | 94.00 | 100.00% | 21.28% | 100.00% |

>>> This makes a clear film, but has some insoluble particles, apparently from the CAB.

TABLE VI

Formula #DX-2-a-1
Product: Top Coating

| Ser. # | Name of Ingredient. | Wt. (grams) ---*--------- | Final Formulation Wt. (%) ingredient | Wt. (%) dry solids | Wt. (%) in dry film |
|---|---|---|---|---|---|
| 1 | CAB 553-0.4 = Cellulose Acetate Butyrate - Eastman | 18.10 | 13.86% | 13.86% | 63.84% |
| 2 | acrylic B723 = DSM-NeoResins. | 10.25 | 7.85% | 7.85% | 36.16% |
| 3 | Alcohol, denatured, 95% | 67.19 | 51.45% |  |  |
| 4 | Isopropyl Alcohol | 14.00 | 10.72% |  |  |
| 5 | Diacetone Alcohol | 21.06 | 16.13% |  |  |
|  | Total Input >>>>>>> = | 130.60 | 100.00% | 21.71% | 100.00% |

>>> This makes a clear film, but is very viscous (+5500 cps) at these concentrations. Also, develops a slight haze upon standing for 2 weeks.

TABLE VII

Formula #DX-2-a-1-a.
Product: Top Coating

| Ser. # | Name of Ingredient. | Wt. (grams) ---*--------- | Final Formulation Wt. (%) ingredient | Wt. (%) dry solids | Wt. (%) in dry film |
|---|---|---|---|---|---|
| 1 | CAB 553-0.4 = Cellulose Acetate Butyrate - Eastman | 18.85 | 14.08% | 14.08% | 59.65% |
| 2 | acrylic B723 = DSM-NeoResins. | 10.25 | 7.66% | 7.66% | 32.44% |
| 3 | SAIB 100 = Sucrose Acetate Isobutyrate - Eastman | 2.50 | 1.87% | 1.87% | 7.91% |
| 4 | Alcohol, denatured, 95% | 67.19 | 50.20% |  |  |

TABLE VII-continued

Formula #DX-2-a-1-a.
Product: Top Coating

Final Formulation

| Ser. # | Name of Ingredient. | Wt. (grams) ---*--------- | Wt. (%) ingredient | Wt. (%) dry solids | Wt. (%) in dry film |
|---|---|---|---|---|---|
| 5 | Isopropyl Alcohol | 14.00 | 10.46% | | |
| 6 | Diacetone Alcohol | 21.06 | 15.73% | | |
| | Total Input >>>>>>> = | 133.85 | 100.00% | 23.61% | 100.00% |

>>> This makes a clear film. Viscosity was 450 cps at 25 degrees C. Also, develops a 5% increase in viscosity upon standing for 2 weeks.

TABLE VIII

Formula #R-4
Product: Coating Remover

Final Formulation

| Ser. # | Name of Ingredient. | Wt. (grams) ---*--------- | Wt. (%) ingredient | CAS # |
|---|---|---|---|---|
| 1 | tetrahydrofurfuryl alcohol | 66.00 | 66.00% | 97-99-4 |
| 2 | Dibasic Ester | 10.00 | 10.00% | |
| 3 | Diacetone Alcohol | 6.00 | 6.00% | |
| 4 | EEP Solvent (ethyl 3-ethoxypropionate) | 6.00 | 6.00% | |
| 5 | texanol ester (2,2,4-trimethyl-1,3-pentanediol monoisobutyrate) | 6.00 | 6.00% | |
| 6 | White mineral oil | 5.00 | 5.00% | 8042-47-5 |
| 7 | Surfonic n-95 | 0.50 | 0.50% | |
| 8 | methocell 311 | 0.50 | 0.50% | |
| | Total Input >>>>>>> = | 100.00 | 100.00% | |

>>> This makes a less hazy viscous liquid. Viscosity was 400 cps at 25 degrees C. Density is 1.05 to 1.10 at 25 degrees C.

A General Note on Mixing Procedure and Method

All blending vessels were made of stainless steel and were grounded using a flexible clamp wired to a copper grounding strap to prevent any sparking due to static charge build up. The stirring system had a disperser type blade and a variable speed explosion proof motor fitted to it. All electrical fittings in the mixing area were suitable for Class I, Division I flammable materials handling environment. The vessels were enclosed and covered to prevent any major losses of volatile materials.

Example 1

Preparing a mixture of the solvents in accordance with Table I:

Four formulations are shown as an example. The two formulations M2 and M3 for the solvent mixtures were used in preparing the coatings, and have slightly different proportions of the components, as these were required to achieve the optimum solubilities for the different resins used to prepare the various coatings. Formulation M3 is environmentally friendly as it contains no HAPS, the ingredients are exempt solvents and are all biodegradable.

These blends produce mixtures that may also be used as diluent reducers for thinning down the final coating to make it suitable for spraying applications. The theoretical evaporation rate for Reducer M0 is lowest and Reducer M3 is fastest. These are all with reference to an arbitrary standard evaporation rate for n-butyl acetate equal to one. It is necessary in colder conditions to have a slightly faster evaporation rate, whereas in warmer conditions a slower evaporating mixture is preferred. The term "retarder" is used for a blend of thinning solvents that has a slower evaporation rate compared to the blend that has a medium rate of evaporation. Hence, M0 may be considered a retarder, and M3 may be considered a reducer for this coating system.

M2: A 100 lb. batch of the retarder M2 was prepared. Thirty-five lbs. of denatured ethyl alcohol (35%) was added, followed by 15 lbs. of isopropyl alcohol (15%) and 20 lbs. of diacetone alcohol (20%). Five lbs. of EB Solvent (Ethylene glycol n-butyl ether) (5%) was added, followed by 20 lbs. of PM acetate (propylene glycol monomethyl ether acetate) (20%) and 5 lbs. of tetrahydrofurfuryl alcohol (5%). The mixture was gently stirred for 15 minutes to complete this procedure.

M3: A 100 lb. batch of the retarder M3 was prepared. Thirty-five lbs. of denatured ethyl alcohol (35%) was added, followed by 15 lbs. of isopropyl alcohol (15%) and 20 lbs. of diacetone alcohol (20%). Twenty lbs. of PM acetate (propylene glycol monomethyl ether acetate) (20%) were added, then 5 lbs. of tetrahydrofurfuryl alcohol (5%). and 5 lbs. of EEP Solvent (ethyl 3-ethoxypropionate) (5%). The mixture was gently stirred for 15 minutes to complete this procedure.

Example 2

Preparing the Top Coating #M16 in accordance with Table II:

100 lb. of the coating was prepared. Seventy-nine and 87/100 lb. of solvents mixture M2 (79.87%) was added to the mixing vessel. While mixing slowly, 11 and 96/100 lb. (11.96%) of CAB 553-0.4 Cellulose Acetate Butyrate powder from Eastman Chemical was gradually added into the liquid. The liquid was mixed for 30 minutes to ensure no big lumps of the agglomerated polymer remain in the liquid. Three and 99/100 lb. (3.99%) of acrylic B734 from DSM-NeoResins were gradually added to the liquid while mixing. Two and 66/100 lb. (2.66%) of acrylic BR106 from Dianal America were gradually added to the liquid while mixing. One and 33/100 lb. (1.33%) of SAIB 100 Sucrose Acetate Isobutyrate from Eastman Chemicals were gradually added to the liquid while mixing. Zero and 7/100 lb. (0.07%) of Tinuvin 292 UV light stabilizer; zero and 7/100 lb. (0.07%) of Tinuvin 1130 UV absorber were slowly added and mixing continued to ensure good dispersion. Zero and 5/100 lb. (0.05%) of BYK 307 surface additive from BYK-Chemie GmbH was gradually added to the liquid while mixing. Mixing was continued for about 45 minutes to ensure no undissolved particles remained in the solution. Minor adjustments may be made at this stage by adding up to 2% of the required components to bring the batch within the specifications.

Quality Control: Samples were drawn to check the viscosity using a Brookfield viscometer. A sample was dried for four hours in an oven at 110 degrees C. to check for the percent solid content. A film was cast on a glass sheet to check for the film clarity and color. During the development stage, hardness, abrasion, elongation and tensile properties of the film were also tested. This formulation makes a clear film. Viscosity at this concentration was 128 cp at 25 degrees C. Also, this gives a good levelling and initial gloss, but shows very slight blushing effects. A film was spray coated to test on a car panel. The film showed a very mild attack by "Cleaner-409®" and also by "Windex®" solution.

Example 3

Preparing the Top Coating #M16A in accordance with Table III:

100 lb. of the coating was prepared. Seventy-five and 84/100 lb. of solvents mixture M3 (75.84%) was added to the mixing vessel. While mixing slowly, sixteen and 41/100 lb. (16.41%) of CAB 553-0.4 Cellulose Acetate Butyrate powder from Eastman Chemical was gradually added into the liquid. The liquid was mixed for 30 minutes to ensure no big lumps of the agglomerated polymer remain in the liquid. Three and 79/100 lb. (3.79%) of acrylic B734 from DSM-NeoResins were gradually added to the liquid while mixing. Two and 53/100 lb. (2.53%) of acrylic BR106 from Dianal America were gradually added to the liquid while mixing. One and 20/100 lb. (1.20%) of SAIB 100 Sucrose Acetate Isobutyrate from Eastman Chemicals were gradually added to the liquid while mixing. Zero and 7.5/100 lb. (0.075%) of Tinuvin 292 UV light stabilizer; zero and 7.5/100 lb. (0.075%) of Tinuvin 1130 UV absorber were slowly added and mixing continued to ensure good dispersion. Zero and 8/100 lb. (0.08%) of BYK 307 surface additive from BYK-Chemie GmbH was gradually added to the liquid while mixing. Mixing was continued for about 45 minutes to ensure no undissolved particles remained in the solution. Minor adjustments may be made at this stage by adding up to 2% of the required components to bring the batch within the specifications.

Quality Control: The same procedures were used for quality control as shown in Example 2.

This formulation makes a clear film. Viscosity at this concentration was 275 cps at 25 degrees C. Also, this gives a good levelling and initial gloss. A film was spray coated to test on a car panel. The film showed no attack by "Cleaner-409®" or by "Windex®" solution. The film had good hardness & adhesion.

Example 4

Preparing the Top Coating #DX-2-a-2 in accordance with Table IV:

100 lb. of the coating was prepared. Fifty-seven and 45/100 lb. (57.45%) of ethyl alcohol and 21 and 28/100 lb. (21.28%) of diacetone alcohol was added to the mixing vessel. While mixing slowly, 80 and 51/100 lb. (8.51%) of CAB 531.1 Cellulose Acetate Butyrate powder from Eastman Chemical was gradually added into the liquid. The liquid was mixed for 30 minutes to ensure no big lumps of the agglomerated polymer remain in the liquid. Twelve and 77/100 lb. (12.77%) of acrylic B723 from DSM-NeoResins were gradually added to the liquid while mixing.

Mixing was continued for about 45 minutes to ensure no undissolved particles remained in the solution. Minor adjustments may be made at this stage by adding up to 2% of the required components to bring the batch within the specifications.

Quality Control: The same procedures were used for quality control as shown in Example 2.

Example 5

Preparing the Top Coating #DX-2-c-2 in accordance with Table V:

100 lb. of the coating was prepared. Fifty-seven and 45/100 lb. (57.45%) of ethyl alcohol and 21 and 28/100 lb. (21.28%) of diacetone alcohol was added to the mixing vessel. While mixing slowly, 8 and 51/100 lb. (8.51%) of CAB 531.1 Cellulose Acetate Butyrate powder from Eastman Chemical was gradually added into the liquid. The liquid was mixed for 30 minutes to ensure no big lumps of the agglomerated polymer remain in the liquid. Twelve and 77/100 lb. (12.77%) of acrylic B734 from DSM-NeoResins were gradually added to the liquid while mixing.

Mixing was continued for about 45 minutes to ensure no undissolved particles remained in the solution. Minor adjustments may be made at this stage by adding up to 2% of the required components to bring the batch within the specifications.

Quality Control: The same procedures were used for quality control as shown in Example 2.

Example 6

Preparing the Top Coating #DX-2-a-1 in accordance with Table VI:

100 lb. of the coating was prepared. Fifty-one and 45/100 lb. (51.45%) of ethyl alcohol, and 16 and 13/100 lb. (16.13%) of diacetone alcohol and 10 and 72/100 lb. (10.72%) of isopropyl alcohol was added to the mixing vessel. While mixing slowly, 13 and 86/100 lb. (13.86%) of CAB 553-0.4 Cellulose Acetate Butyrate powder from Eastman Chemical was gradually added into the liquid. The liquid was mixed for 30 minutes to ensure no big lumps of the agglomerated polymer remain in the liquid. Seven and 85/100 lb. (7.85%) of acrylic B723 from DSM-NeoResins were gradually added to the liquid while mixing.

Mixing was continued for about 45 minutes to ensure no undissolved particles remained in the solution. Minor adjustments may be made at this stage by adding up to 2% of the required components to bring the batch within the specifications.

Quality Control: The same procedures were used for quality control as shown in Example 2.

Example 7

Preparing the Top Coating #DX-2-a-1-a in accordance with Table VII:

100 lb. of the coating was prepared. Fifty and 20/100 lb. (50.20%) of ethyl alcohol, and 15 and 73/100 lb. (15.73%) of diacetone alcohol and 10 and 46/100 lb. (10.46%) of isopropyl alcohol was added to the mixing vessel. While mixing slowly, 14 and 08/100 lb. (14.08%) of CAB 553-0.4 Cellulose Acetate Butyrate powder from Eastman Chemical was gradually added into the liquid. The liquid was mixed for 30 minutes to ensure no big lumps of the agglomerated polymer remain in the liquid. Seven and 66/100 lb. (7.66%) of acrylic B723 from DSM-NeoResins were gradually added to the liquid while mixing. One and 87/100 lb. (1.87%) of SAIB 100 Sucrose Acetate Isobutyrate from Eastman Chemicals were gradually added to the liquid while mixing. Mixing was continued for about 45 minutes to ensure no undissolved particles remained in the solution. Minor adjustments may be made at this stage by adding up to 2% of the required components to bring the batch within the specifications.

Quality Control: The same procedures were used for quality control as shown in Example 2.

Example 8

Preparing the Coating Remover #R-4 in accordance with Table VIII:

100 lb. of the remover was prepared. Sixty-six lb. (66.00%) of tetrahydrofurfuryl alcohol, and 10 lb. (10.00%) of dibasic ester and 6 lb. (6.00%) of Diacetone Alcohol and 6 lb. (6.00%)

of EEP Solvent (ethyl 3-ethoxypropionate) and 6 lb. (6.00%) of texanol ester (2,2,4-trimethyl-1,3-pentanediol monoisobutyrate) were added to the mixing vessel. While mixing slowly, 5 lb. of white mineral oil, zero and 05/100 lb. (0.50%) of Surfonic n-95 and zero and 05/100 lb. (0.50%) of methocell 311 were gradually added into the liquid. The liquid was mixed for 30 minutes to ensure no big lumps of the agglomerated polymer remain in the liquid. Mixing was continued for about 45 minutes to ensure no undissolved particles remained in the solution. Minor adjustments may be made at this stage by adding up to 2% of the required components to bring the batch within the specifications.

Quality Control: Ten mil wet films of the top coating are cast, dried and an adhesive layer is stuck on the back. The remover is then used to check for efficiently dissolving all parts of the coating and the adhesive.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the present patent specification as a whole.

What is claimed:

1. A process for protecting a surface of a substrate, comprising
   A) applying a formulation to the surface, wherein the formulation comprises the following ingredients in a solvent comprising at least one alcohol:
      i) cellulose acetate butyrate ester at 40 to 80% dry weight of the total dry weight of the formulation;
      ii) at least one acrylic polymer at 15 to 60% dry weight of the total dry weight of the formulation; and
      iii) sucrose acetate isobutyrate at 2 to 10% dry weight of the total dry weight of the formulation; and
   B) drying the formulation to form a temporary removable dry coating on the surface, wherein the substrate is an automobile, vehicle capable of moving, marine or aeronautical craft, equipment or machinery,
   wherein the at least one acrylic polymer is a methyl methacrylate and n-butyl methacrylate copolymer.

2. The process of claim 1, wherein the cellulose acetate butyrate ester has a hydroxyl content of approximately 3 to 6% by dry weight of the cellulose acetate butyrate ester.

3. The process of claim 2, wherein the cellulose acetate butyrate ester is CAB 553-0.4, wherein CAB 553-0.4 is a cellulose acetate butyrate having, on the average, butyryl content of about 46 wt %, acetyl content of about 2 wt %, hydroxyl content of about 4.8 wt %, glass transition temperature of about 136° C., melting point of about 150-160° C., and molecular weight of about 20,000.

4. The process of claim 2, wherein the cellulose acetate butyrate ester is CAB 531.1, wherein CAB 531.1 is a cellulose acetate butyrate having, on the average, butyryl content of about 50 wt %, acetyl content of about 3 wt %, hydroxyl content of about 1.7 wt %, melting point of about 135-150° C., glass transition temperature of about 115° C., and molecular weight of about 40,000.

5. The process of claim 1, wherein the at least one acrylic polymer is selected from NeoCryl B-734, NeoCryl B-734, BR-106, and mixtures thereof, wherein NeoCryl B-734 is a methyl methacrylate and n-butyl methacrylate copolymer having an average molecular weight of 105,000, a glass transition temperature of 45° C. and an acid value of zero; NeoCryl B-723 is a methyl methacrylate and n-butyl methacrylate copolymer having a molecular weight of about 200,000, a glass transition temperature of 48° C. and an acid value of 5.5; and BR-106 is a methyl methacrylate and n-butyl methacrylate copolymer having a molecular weight of approximately 60,000, a glass transition temperature of 58° C. and an acid value of 3.0.

6. The process of claim 5, wherein the at least one acrylic polymer is NeoCryl B-734.

7. The process of claim 5, wherein the at least one acrylic polymer is NeoCryl B-723.

8. The process of claim 5, wherein the at least one acrylic polymer is BR-106.

9. The process of claim 1, wherein the solvent comprises methanol, ethanol, isopropyl alcohol, n-propyl alcohol, diacetone alcohol or a mixture thereof.

10. The process of claim 9, wherein the solvent comprises a mixture of isopropyl alcohol and diacetone alcohol.

11. The process of claim 1, wherein the solvent further comprises at least one glycol ether.

12. The process of claim 11, wherein the glycol ethers comprises ethylene glycol n-butyl ether.

13. The process of claim 1, wherein the solvent comprises ethyl alcohol, isopropyl alcohol, diacetone alcohol, propylene glycol monomethyl ether acetate, tetrahydrofurfuryl alcohol and ethyl 3-ethoxypropionate.

14. The process of claim 13, wherein the solvent comprises approximately 20 to 30 weight % ethyl alcohol, approximately 10 to 12 weight % isopropyl alcohol, approximately 10 to 20 weight % diacetone alcohol, approximately 10 to 20 weight % propylene glycol monomethyl ether acetate, approximately 2 to 5 weight % tetrahydrofurfuryl alcohol and approximately 2 to 5 weight % ethyl 3-ethoxypropionate.

15. The process of claim 14, wherein the solvent comprises approximately 26 weight % ethyl alcohol, approximately 11 weight % isopropyl alcohol, approximately 15 weight % diacetone alcohol, approximately 15 weight % propylene glycol monomethyl ether acetate, approximately 4 weight % tetrahydrofurfuryl alcohol and approximately 4 weight % ethyl 3-ethoxypropionate.

16. The process of claim 1, wherein the formulation further comprises a pigment.

17. The process of claim 16, wherein the pigment is metalized.

18. The process of claim 16, wherein the dry coating of the formulation makes a temporary removable sign on the surface.

19. The process of claim 1, wherein the formulation further comprises a flow improver at 0.1 weight % to 1 weight % of the total dry weight of the formulation.

20. The process of claim 19, wherein the flow improver is a fluorocarbon, low molecular weight acrylic, or surfactant.

21. The process of claim 19, wherein the flow improver added is a polyether modified polydimethylsiloxane.

22. The process of claim 1, wherein the formulation further comprises a light stabilizer at 0.1 weight % to 2 weight % of the total dry weight of the formulation.

23. The process of claim 22, wherein the light stabilizer is a mixture of bis(1,2,2,6,6-pentamethyl-4-piperidyl) sebacate, and methyl (1,2,2,6,6-pentamethyl-4-piperidyl) sebacate.

24. The process of claim 22, wherein the light stabilizer is benzotriazole.

25. The process of claim 22, wherein the light stabilizer is a combination of bis(1,2,2,6,6-pentamethyl-4-piperidyl) sebacate, methyl (1,2,2,6,6-pentamethyl-4-piperidyl) sebacate and benzotriazole.

26. The process of claim 1, wherein the cellulose acetate butyrate ester in step (A) is used in an amount of approximately 68% by dry weight of the formulation, and the at least one acrylic polymer is a mixture of: a higher molecular weight methyl methacrylate and n-butyl methacrylate copolymer in an amount of approximately 15% by dry weight of the formulation and a combination of lower molecular weight copolymer of methyl methacrylate and n-butyl methacrylate in an amount of approximately 10% by dry weight of the formulation.

27. The process of claim 1, wherein the surface is painted.

28. The process of claim 27, wherein the formulation is pigmented or colored to match the existing color and gloss of the painted surface.

29. The process of claim 27, wherein the dry coating is buffed and compounded.

30. The process of claim 1, wherein the formulation is applied in step A) via spraying, screen printing or roller.

31. The process of claim 1, wherein the formulation is applied by spraying in step A).

32. The process of claim 1, further comprising removing the dry coating after step B).

33. The process of claim 32, wherein the dry coating is removed by applying a remover composition comprising comprising:
   a) 50 to 80 weight % tetrahydrofurfuryl alcohol;
   b) 5 to 20 weight % dibasic ester;
   c) 1 to 12 weight % diacetone alcohol;
   d) 1 to 12 weight % ethyl 3-ethoxypropionate; and
   e) 1 to 12 weight % 2,2,4 trimethyl-1,3 pentanediol monoisobutyrate;
   f) 1 to 10 weight % white mineral oil;
   g) 0.25 to 2.0 weight % surfactant; and
   h) 0.25 to 4.0 weight % thickening agent;
   wherein the weight % is based on the total dry weight of the remover composition.

* * * * *